Feb. 4, 1947.　　　A. H. HOPMANS　　　2,415,245
MASTER CYLINDER
Filed Dec. 27, 1943
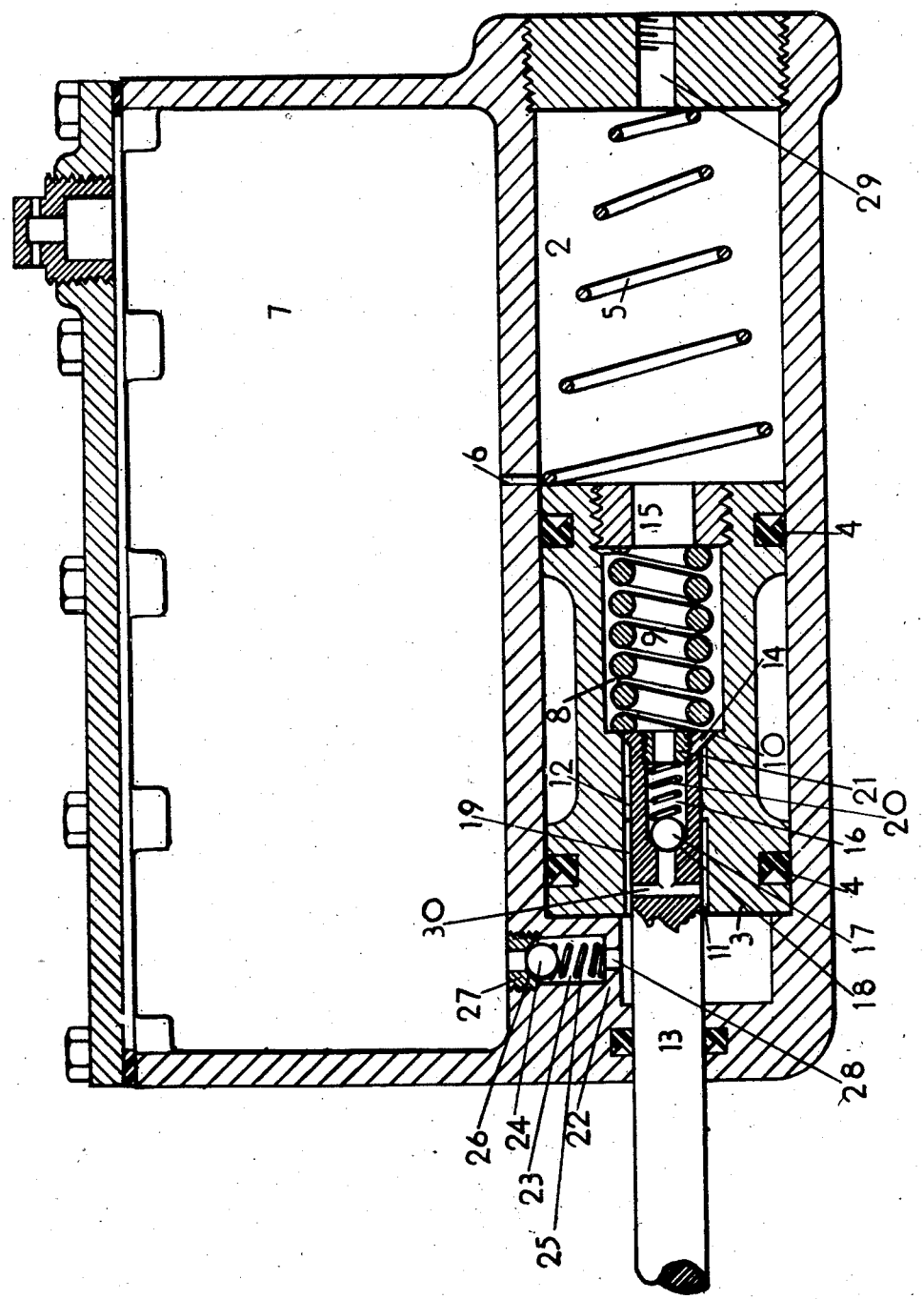
INVENTOR.
BY Arthur H. Hopmans Patented Feb. 4, 1947

2,415,245

UNITED STATES PATENT OFFICE 2,415,245

MASTER CYLINDER

Arthur Henry Hopmans, Paulding, Ohio

Application December 27, 1943, Serial No. 515,686

6 Claims. (Cl. 60—54.6)

My invention relates to a driving element for a hydraulic power system and has particular reference to a driving element or master cylinder for use in hydraulic systems such as hydraulic brakes for automobiles and hydraulically operated clamps and work holding devices.

In certain driving elements for hydraulic systems, notably the master cylinders used in hydraulic brakes on automobiles and trucks, the first and greatest part of the piston stroke is delivered at low pressure for the purpose of moving the brake shoes into engagement with the drum and the last and smallest portion of the piston stroke is delivered at high pressure for the performance of the actual braking operation. The type of piston best suited for the first part of the stroke would therefore be one of large diameter for the delivery of a large volume of fluid. The type of piston best suited for the last part of the stroke would be one of small diameter for the delivery of fluid at a high pressure. From the foregoing it will be seen that the size piston used in conventional master cylinders is a compromise to suit two very different requirements.

The present invention is directed to a master cylinder which may be used for the purpose of delivering a large volume of fluid and a high pressure.

It is therefore an object of the present invention to provide a master cylinder which overcomes the disadvantages above referred to by the delivery of a large volume of fluid during the first part of the stroke and the delivery of high pressure fluid during the last part of the stroke.

It is also an object of my invention to provide a master cylinder of the character referred to in the preceding paragraph in which the delivery of a large volume of fluid and the delivery of high pressure fluid are successively accomplished by a single application of force.

Other objects of my invention will become apparent from the following description taken in connection with the accompanying drawing in which the figure is a sectional view of a master cylinder mechanism.

Referring to the drawing in detail, numeral 2 indicates a cylinder having reciprocably mounted therein a piston 3 with associated packing rings 4. A retracting spring 5 normally biases the piston to an inoperative position and when in this position the piston will uncover a porthole 6 for placing the portion of the cylinder to the right of the piston in communication with a reservoir 7 adjoining the cylinder. The piston is provided with a recess 8 to hold a relief valve spring 9 and a further recess 10 to form a valve seat, and a cored hole 11 to permit passage of fluid through the piston, and having guides 12 therein to support the rod 13. The rod has an enlarged end 14 adapted to be held fluid tight in its seat 10 and to furnish a bearing surface for the spring 9. The spring 9 is confined between the enlarged end 14 of the rod and a threaded retainer ring 15 is preferably screwed into the outer end of the recess 8. The rod 13 constitutes a check valve housing and is accordingly interiorly bored as shown at 16 to receive a ball valve member 17 which is spring urged against a valve seat 18 to close a fluid passage 30, a compression spring 20 being confined between the ball 17 and a threaded retainer ring 21 preferably screwed into the right hand end of the bore 16.

At the left hand end of the cylinder is provided an integral boss 22 which is bored as indicated at 23 to form a communicating passage between the cylinder 2 and the reservoir 7 and to receive a ball check valve 24 normally urged upward as by means of a spring 25 into engagement with a valve seat 26 in a retainer ring 27 threaded into the upper end of the bore 23. The spring 25 is confined between the ball 24 and a shoulder defined by the bore 23 and a small diameter bore 28.

I have shown in the figure the relative positions occupied by the described parts when the master cylinder is idle and no pressure is being developed. When the master cylinder is operated by applying a force to the rod 13 and the piston 3 is slid to the right, the port hole 6 will first be cut off and the piston 3 will begin to develop pressure forcing fluid through the port 29 into the system (not shown), at the same time a subatmospheric pressure will develop at the left hand side of the piston and the ball 24 will leave its seat 26 to permit fluid to pass from the reservoir 7 into the portion of the cylinder to the left of the piston.

It will be recognized that during this phase of the operation the relief valve spring 9 has served to hold the enlarged end 14 of rod 13 into fluid tight engagement with its seat 10. When the system beyond the port 29 is filled with fluid, further movement rightwardly of the rod 13 will cause the development, in the portion of the cylinder to the right of the piston, of an increased pressure. When this increased pressure, acting on the face of the piston, exceeds the pressure exerted by the relief valve spring 9 the enlarged end 14 of the rod 13 will leave its seat 10 permitting a portion of the fluid displaced by the rightward movement of the piston 3 to pass between the enlarged end 14 of the rod 13 and the seat 10 through the fluid passage 19 and between the guides 12 into the portion of the cylinder to the left of the piston.

When the passage between the right hand end of the piston and the left hand end of the piston is opened as above described the pressure between ends will be equalized and the ball 24 will resume its seat 26.

Additional application of force to the rod 13 will now discontinue to be transferred to the fluid through the entire piston area and will be impressed upon the fluid solely through the displacement area of the rod 13 with a resultant greatly increased static pressure per unit of force applied to the rod 13.

In other words, the piston 3 is hydrostatically floating, and the entire pressure is due to the displacement of fluid within the cylinder 2 by the mechanisms disposed therein. The only such mechanism capable of increasing its displacement at this stage is the rod 13, which may move inwardly into the entire mass of fluid within the cylinder 2. Because of the small cross sectional area of the rod 13 relative to that of the cylinder 2, a great multiplication of liquid pressure is obtainable.

From the foregoing it will be obvious that placing the piston 3 in hydrostatic equilibrium by virtue of opening the passage 19 yields these increased pressures. By contrast, if the rod 13 had a sealing engagement with the piston 3, the increased liquid pressure due to its displacement would be reflected backwardly upon the piston 3, increasing the compression of spring 9. The normal pressure applied to the rod 13 under these circumstances would be transmitted to the entire piston 3 and would result in no multiplication. The extreme condition of this contrasting structure would be reached when the spring 9 would be completely compressed and become a solid mechanical force transmitting member.

Upon release of force on the rod 13 the resultant drop in pressure will permit the spring 9 to return the enlarged portion 14 of the rod 13 to its seat 10, at the same time the retracting spring 5 will urge the piston 3 leftwardly and set up a pressure differential between the two ends of the piston which will cause the ball 17 to leave its seat 18 and permit the fluid displaced by the leftward movement of the piston 3 to move through the fluid passage 30 into the portion of the cylinder to the right of the piston. When the piston 3 has reached its extreme leftward position the port hole 6 will again be uncovered and the ball 17 will return to its seat 18 hence the master cylinder will again be at its idle position as illustrated in the figure.

From the foregoing it will be observed that I have provided a master cylinder characterized by providing members adaptable to delivery of maximum flow of fluid during the first portion of the piston stroke and maximum pressure during the final portion of the stroke.

Being aware of the possibility of modifications of the particular construction shown or described herein without departing from the fundamental principles of my invention, I do not intend that its scope be limited except as set forth by the appended claims.

Having fully described my invention, what I claim as new and desire to secure by Letters Patent of the United States is:

1. In a master cylinder, a reservoir, a cylinder, means closing the end of the cylinder behind the piston and providing for a piston rod to pass therethrough, means closing the end of the cylinder ahead of the piston and providing connection means for fluid conduit, a piston reciprocal in said bore and having a packing ring at each end, a recess in the face of the piston, a valve seat at the bottom of the recess, a bore through the piston, guide means in the bore for a piston rod, at least one fluid passage past the guide means, a piston rod having an enlarged end adapted to fit the valve seat, a fluid passage in the piston rod, a check valve in the piston rod fluid passage permitting fluid flow from the portion of the cylinder behind the piston to the portion of the cylinder ahead of the piston, a ring threaded into the said recess, a compression spring between the ring and the enlarged end of the piston rod operably connecting the said piston with the piston rod but permitting the enlarged end of the piston rod to leave the said valve seat at a predetermined pressure to permit fluid to pass from the portion of the cylinder in front of the piston to the portion of the cylinder in back of the piston, means permitting the reservoir to have two-way communication with the portion of the cylinder ahead of the piston only when the piston is in retracted position, check valve means for permitting fluid to flow from the reservoir to the cylinder behind the piston, and a piston retraction spring.

2. In a master cylinder device, a cylinder, a piston, at least one packing ring at each end of said piston, a reservoir, means permitting the reservoir to have two-way communication with the cylinder ahead of the piston only when the piston is in the retracted position, check valve means for permitting fluid to flow from the reservoir to the cylinder behind the piston, a piston retracting spring, check valve means for permitting fluid to flow from the portion of the cylinder behind the piston to the portion of the cylinder ahead of the piston, a piston rod adapted to displace fluid within the said cylinder and control movement of said piston, a fluid passage extended axially through the said piston, the said piston rod slidably mounted through the said fluid passage, on the end of the piston rod nearest the front of the said piston a valve member adapted to fluid tight engagement with the end of the said fluid passage nearest the front of the piston, yieldable means for holding the said valve member in fluid tight engagement with the end of the said fluid passage and operatively connecting the piston with the piston rod.

3. In a device of the class described, the combination of: a cylinder housing defining a cylinder bore; means closing one end of said cylinder housing and providing connection means for at least one fluid conduit; means closing the other end of said cylinder housing and providing an aperture for insertion of a piston rod therethrough; a piston reciprocal in said bore having a fluid passage extended axially therethrough; a piston rod slidably mounted through said aperture and said fluid passage and having an enlarged end adapted to fluid tight engagement with the mouth of the said fluid passage toward the face of the said piston; yieldable means for holding the enlarged end of said piston rod in fluid tight engagement with the mouth of the said fluid passage; at least one fluid passage in the said piston rod with check valve means therein to permit flow of fluid from the portion of the said cylinder in back of the said piston to the portion of the said cylinder in front of said piston; check valve means for permitting flow from a source of fluid to the portion of the said cylinder in back of the said piston; and means for permitting the portion of the said cylinder in front of the said piston to have two-way communication with a source of fluid only when the said piston is in retracted position.

4. In a master cylinder device, a cylinder, a piston, a reservoir and means permitting the reservoir to have two-way communication with the portion of the cylinder ahead of the piston only when the piston is in retracted position, check valve means permitting fluid to flow from the reservoir to the portion of the cylinder behind the piston, a piston rod adapted to control movement of the said piston and also adapted to displace fluid in the said cylinder, check valve means for permitting fluid in the portion of the cylinder behind the piston to flow into the portion of the cylinder in front of the piston, the said piston having a fluid passage extending axially therethrough, the said piston rod slidably mounted through said fluid passage and having means normally blocking the said fluid passage but unblocking the said fluid passage upon forward movement of the piston rod relative to the piston, and spring means operatively connecting the piston with the piston rod to move forward together but permit forward movement of the piston rod relative to the piston when the fluid offers a predetermined resistance to the piston.

5. In a master cylinder device, a cylinder, a piston, check valve means for permitting fluid to flow from the portion of the cylinder in back of the piston to the portion of the cylinder in front of the piston, a fluid passage extending axially through said piston, a piston rod slidably mounted through said fluid passage and having means normally blocking the said fluid passage but unblocking the said fluid passage upon forward movement of the piston rod relative to the piston, spring means operatively connecting the piston with the piston rod to move forward together but permit forward movement of the piston rod relative to the piston when the fluid offers a predetermined resistance to the piston, and check valve means for permitting flow of fluid into the portion of the cylinder in back of the piston.

6. In a master cylinder device, the combination of: a cylinder; a piston movable in said cylinder forwardly from a retracted position; a piston rod for so moving said piston; passage means interconnecting opposite ends of said cylinder; check valve means in said passage for preventing flow of fluid through said passage upon forward movement of said piston; a source of reserve fluid; means connecting said source to said cylinder behind said piston; check valve means for preventing flow of fluid from said cylinder to said source; means interconnecting said piston rod and said piston for permitting movement of said piston rod relative to said piston when the fluid pressure opposing forward motion of said piston rises to a predetermined value; and means responsive to movement of said piston rod relative to said piston for establishing a fluid interconnection through said piston from one end thereof to the other.

ARTHUR HENRY HOPMANS.

REFERENCES CITED

The following references are of record in the file of this patent:

UNITED STATES PATENTS

| Number | Name | Date |
|---|---|---|
| 2,041,164 | Carroll | May 19, 1936 |
| 2,197,681 | Bowen | Apr. 16, 1940 |
| 2,298,848 | Swift | Oct. 13, 1942 |
| 2,317,473 | Miller | Apr. 27, 1943 |
| 2,340,113 | Dodge | Jan. 25, 1944 |
| 2,299,979 | Hammond | Oct. 27, 1942 |
| 2,343,900 | Groves | Mar. 14, 1944 |

FOREIGN PATENTS

| Number | Country | Date |
|---|---|---|
| 607,748 | German | Jan. 12, 1935 |